US012748900B2

(12) United States Patent
Yang et al.

(10) Patent No.: US 12,748,900 B2
(45) Date of Patent: Sep. 29, 2026

(54) FRAMEWORK FOR SYSTEM SIMULATION USING MULTIPLE SIMULATORS

(71) Applicant: Xilinx, Inc., San Jose, CA (US)

(72) Inventors: Ji Yang, Coram, NY (US); Haris Javaid, Singapore (SG); Sundararajarao Mohan, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 1129 days.

(21) Appl. No.: 17/662,818

(22) Filed: May 10, 2022

(65) Prior Publication Data

US 2023/0367923 A1 Nov. 16, 2023

(51) Int. Cl.
*G06F 30/20* (2020.01)
*G06F 111/02* (2020.01)
*H04L 9/00* (2022.01)

(52) U.S. Cl.
CPC ................ *G06F 30/20* (2020.01); *H04L 9/50* (2022.05); *G06F 2111/02* (2020.01)

(58) Field of Classification Search
CPC ......... G06F 30/20; G06F 2111/02; H04L 9/50
USPC .............................................................. 703/2
See application file for complete search history.

(56) References Cited

U.S. PATENT DOCUMENTS

| | | | |
|---|---|---|---|
| 7,197,445 | B1 | 3/2007 | Deepak |
| 7,302,377 | B1 | 11/2007 | Deepak |
| 7,330,808 | B1 | 2/2008 | Jorgensen |
| 7,451,417 | B1 | 11/2008 | Carrillo |
| 7,590,137 | B1 | 9/2009 | Chan |
| 7,636,653 | B1 | 12/2009 | Chan |
| 7,673,201 | B1 | 3/2010 | Chan et al. |
| 7,707,019 | B1 | 4/2010 | Ballagh |
| 7,721,090 | B1 | 5/2010 | Deepak |
| 7,739,092 | B1 | 6/2010 | Ballagh |
| 7,895,026 | B1 | 2/2011 | Kelly |
| 7,930,162 | B1 | 4/2011 | Chan |

(Continued)

OTHER PUBLICATIONS

Androulaki et al. (Hyperledger Fabric: A Distributed Operating System for Permissioned Blockchains, arXiv, 2018, pp. 1-15) (Year: 2018).*

(Continued)

*Primary Examiner* — Iftekhar A Khan
(74) *Attorney, Agent, or Firm* — Kevin T. Cuenot

(57) ABSTRACT

A simulation framework is capable of modeling a hardware implementation of a reference software system using models specified in different computer-readable languages. The models correspond to different ones of a plurality of subsystems of the hardware implementation. Input data is provided to a first simulator configured to simulate a first model of a first subsystem of the modeled hardware implementation. The input data is captured from execution of the reference software system. The first simulator executing the first model generates a first data file specifying output of the first subsystem. The first data file specifies intermediate data of the modeled hardware implementation. The first data file is provided to a second simulator configured to simulate a second model of a second subsystem of the modeled hardware implementation. The second simulator executing the second model generates a second data file specifying output of the second subsystem.

20 Claims, 8 Drawing Sheets

(56) References Cited

U.S. PATENT DOCUMENTS

| | | | | |
|---|---|---|---|---|
| 8,041,553 | B1 * | 10/2011 | Hernandez | G01R 31/318357 716/136 |
| 8,074,077 | B1 | 12/2011 | Neema | |
| 8,150,638 | B1 | 4/2012 | Wu | |
| 8,195,441 | B1 * | 6/2012 | Ou | G06F 30/331 716/117 |
| 8,224,638 | B1 | 7/2012 | Shirazi | |
| 8,352,229 | B1 | 1/2013 | Ma | |
| 8,640,064 | B1 * | 1/2014 | Liddell | G06F 30/33 716/106 |
| 9,117,043 | B1 | 8/2015 | Huang et al. | |
| 9,396,154 | B2 * | 7/2016 | Garg | H04L 63/0485 |
| 10,291,627 | B2 * | 5/2019 | Gleichauf | H04W 12/10 |
| 10,296,673 | B1 * | 5/2019 | Ghosh | G06F 30/327 |
| 10,325,042 | B1 * | 6/2019 | Sharma | G06F 30/33 |
| 10,375,105 | B2 * | 8/2019 | Kozloski | H04L 9/0637 |
| 10,387,584 | B1 * | 8/2019 | Popovici | G06F 8/34 |
| 10,417,171 | B1 * | 9/2019 | Sarmah | G06F 1/3253 |
| 10,437,946 | B1 | 10/2019 | Kasat et al. | |
| 10,437,949 | B1 * | 10/2019 | Mihalache | G06F 30/33 |
| 10,586,003 | B1 * | 3/2020 | Suresh | G06F 30/30 |
| 10,671,785 | B1 | 6/2020 | Mihalache et al. | |
| 10,761,877 | B2 * | 9/2020 | Peffers | G06F 9/466 |
| 10,762,479 | B2 * | 9/2020 | Hyun | G06Q 20/0658 |
| 10,816,600 | B1 | 10/2020 | Liddell et al. | |
| 11,314,763 | B2 * | 4/2022 | Opferman | H04L 63/123 |
| 11,443,088 | B1 * | 9/2022 | Verma | G06F 9/463 |
| 11,475,199 | B1 * | 10/2022 | Bandyopadhyay | G06F 30/392 |
| 2009/0024381 | A1 * | 1/2009 | Sakamoto | G06F 11/3698 703/26 |
| 2012/0017197 | A1 * | 1/2012 | Mehta | G06F 30/33 717/106 |
| 2012/0036503 | A1 * | 2/2012 | Reeves | G09B 9/02 717/168 |
| 2013/0039207 | A1 * | 2/2013 | Vadasz | H04L 12/5601 370/252 |
| 2014/0047419 | A1 * | 2/2014 | Gaster | G06F 8/42 717/141 |
| 2014/0325516 | A1 * | 10/2014 | Ventroux | G06F 9/48 718/102 |
| 2015/0301975 | A1 * | 10/2015 | Garg | G06F 13/4221 710/267 |
| 2015/0358211 | A1 * | 12/2015 | Kumar | H04L 41/0806 370/254 |
| 2015/0379172 | A1 * | 12/2015 | Ventroux | G06F 30/331 703/21 |
| 2016/0125113 | A1 * | 5/2016 | Acar | G06F 30/367 716/106 |
| 2018/0060456 | A1 * | 3/2018 | Phatak | G06F 9/5077 |
| 2018/0109541 | A1 * | 4/2018 | Gleichauf | H04W 12/06 |
| 2019/0026146 | A1 * | 1/2019 | Peffers | G06F 9/5044 |
| 2019/0370806 | A1 * | 12/2019 | Wang | G06Q 20/405 |
| 2020/0103930 | A1 * | 4/2020 | Suresh | G06F 1/06 |
| 2020/0119926 | A1 * | 4/2020 | Buki | G06Q 20/401 |
| 2020/0177373 | A1 * | 6/2020 | Komandur | H04L 9/3247 |
| 2020/0311022 | A1 * | 10/2020 | Ginn | G06F 12/0862 |
| 2021/0182423 | A1 * | 6/2021 | Padmanabhan | H04L 9/3271 |
| 2022/0131704 | A1 * | 4/2022 | Javaid | G09C 1/00 |
| 2022/0141025 | A1 * | 5/2022 | Bogineni | H04L 9/3236 713/156 |
| 2022/0172074 | A1 * | 6/2022 | Luo | G06N 3/045 |
| 2022/0366267 | A1 * | 11/2022 | Karmakar | G06F 30/3308 |
| 2023/0032302 | A1 * | 2/2023 | Lavagno | G06F 30/3308 |
| 2023/0114858 | A1 * | 4/2023 | Ksheerasagar | G06F 30/327 716/108 |
| 2023/0267156 | A1 * | 8/2023 | Goel | G06F 16/9532 707/709 |
| 2023/0342775 | A1 * | 10/2023 | Javaid | G06Q 20/401 |

OTHER PUBLICATIONS

Thakkar et al. (Scaling Blockchains Using Pipelined Execution and Sparse Peers, ACM, 2021, pp. 1-15) (Year: 2021).*

Javaid et al. (Optimizing Validation Phase of Hyperledger Fabric, IEEE, 2019, pp. 269-275) (Year: 2019).*

Haris Javaid, Mohit Upadhyay, Ji Yang, Sundararajarao Mohan, Gordon Brebner, Nathania Santoso, and Chengchen Hu, "Blockchain Machine: A Network-Attached Hardware Accelerator for Hyperledger Fabric," Sep. 20, 2021, 13 pages.

* cited by examiner

810

```
block 1
block/tx seq:1,-1
packet:1,75

block/tx seq:1,0
packet:2,1127

db_rd_task:{key:0x6B6E61626C6C616D730000000000000000000000000000000000000000000000, history/
block_id:0x0, history/tx_id:0x0, collection_name:0x6363736c00000000(....lscc)}

db_wr_task:{is_delete:0x0, key:0x6B6E61626C6C616D730000000000000000000000000000000000000000000000,
value:0x011050534D3367724F070A0B120D1A011050534D3267724F070A0B120D1A011050534D3167724F070A0
B120D1A020802120108021200080212010 80E1210123F,collection_name:0x6363736c00000000(....lscc)}

endorser_task:{signature_r:0x4548ADEF4EA56C2AE5BB5347BCB79403134FE1178E14EC8F0D7361C9E9A9A46
3, signature_s:0x8CFA0E4EE82E54C6E924141C0EF2009CEE5FBFCE18B8246173F2BCE38A179628,
endorser_hash:0x01FF, public_key_x:0x02FF, public_key_y:0x03FF, endorser_id:0x12}

endorser_task:{signature_r:0x1234163153BA0D2F7426ED3FF22A712F8C9352BC467C806E135A89A5FC93902A,
signature_s:0xC582D6829DCE39446B71A6C3F489B7B22BDEC90B725FBAB4562B1DDBFE7E1874,
endorser_hash:0x01FF, public_key_x:0x02FF, public_key_y:0x03FF, endorser_id:0x22}

transaction_task:{signature_r:0xF62278C7D08AEB30DDD55B7CE88C6D002686A69E005E24CE5C2E2AF0FC4A7
014, signature_s:0x2129DB7439DEC1F5DBC2B98C876312020C40A7B17CEBFB28C00999A27843262F,
endorser_hash:0x0FF, public_key_x:0x0FF33, public_key_y:0x0FF44, number_of_endorser:2,
number_of_read_task:1, number_of_write_task:1, chaincode_name:0x6363736c00000000(....lscc)}
```

FIG. 9

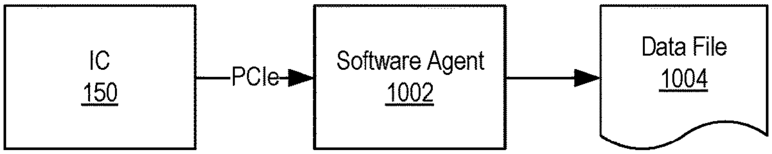

FIG. 10

FRAMEWORK FOR SYSTEM SIMULATION USING MULTIPLE SIMULATORS

STATEMENT REGARDING PRIOR DISCLOSURES BY THE INVENTOR OR A JOINT INVENTOR

The following disclosure(s) are submitted as exceptions under 35 U.S.C. § 102(b)(1)(A):

"Blockchain Machine: A Network-Attached Hardware Accelerator for Hyperledger Fabric," by the following authors and/or contributors: Haris Javaid, Mohit Upadhyay, Ji Yang, Sundararajarao Mohan, Gordon Brebner, Nathania Santoso, and Chengchen Hu, which was published on Sep. 20, 2021.

TECHNICAL FIELD

This disclosure relates to simulation of circuit designs for integrated circuits (ICs) and, more particularly, to a computer-based simulation framework for system simulation using multiple simulators.

BACKGROUND

The complexity of modern circuit designs makes design verification difficult. Many circuit designs implement complex systems that include a variety of different, interconnected subsystems. Often, the subsystems are arranged in a pipelined architecture where one subsystem generates data that is provided to another subsystem as input down the line. As such, the operation of one subsystem often depends on the particular data that is generated by, and provided from, another subsystem.

Computer-based simulation is a valuable tool for verifying the functionality of circuit designs and ensuring that circuit designs are likely to meet established design requirements. Computer-based simulation allows such verification without first having to implement the circuit design within an integrated circuit (IC). The varied types of subsystems and interaction between the subsystems within modern circuit designs, however, makes system-level simulation difficult. System-level simulation, which refers to simulating the entire system within a simulator, e.g., a single simulator, is impractical due to the size and complexity of the system.

SUMMARY

In one or more example implementations, a method can include modeling a hardware implementation of a reference software system using models specified in different computer-readable languages. The models correspond to different ones of a plurality of subsystems of the hardware implementation. The method can include providing input data to a first simulator configured to simulate a first model of a first subsystem of the modeled hardware implementation. The input data is captured from execution of the reference software system. The method can include generating, from the first simulator executing the first model, a first data file specifying output of the first subsystem. The first data file specifies intermediate data of the modeled hardware implementation. The method can include providing the first data file to a second simulator configured to simulate a second model of a second subsystem of the modeled hardware implementation. The method can include generating, from the second simulator executing the second model, a second data file specifying output of the second subsystem.

In one or more example implementations, a system includes a processor configured to initiate operations. The operations can include modeling a hardware implementation of a reference software system using models specified in different computer-readable languages. The models correspond to different ones of a plurality of subsystems of the hardware implementation. The operations can include providing input data to a first simulator configured to simulate a first model of a first subsystem of the modeled hardware implementation. The input data is captured from execution of the reference software system. The operations can include generating, from the first simulator executing the first model, a first data file specifying output of the first subsystem. The first data file specifies intermediate data of the modeled hardware implementation. The operations can include providing the first data file to a second simulator configured to simulate a second model of a second subsystem of the modeled hardware implementation. The operations can include generating, from the second simulator executing the second model, a second data file specifying output of the second subsystem.

In one or more example implementations, a computer program product includes one or more computer-readable storage media, and program instructions collectively stored on the one or more computer-readable storage media. The program instructions are executable by computer hardware to initiate operations. The operations can include modeling a hardware implementation of a reference software system using models specified in different computer-readable languages. The models correspond to different ones of a plurality of subsystems of the hardware implementation. The operations can include providing input data to a first simulator configured to simulate a first model of a first subsystem of the modeled hardware implementation. The input data is captured from execution of the reference software system. The operations can include generating, from the first simulator executing the first model, a first data file specifying output of the first subsystem. The first data file specifies intermediate data of the modeled hardware implementation. The operations can include providing the first data file to a second simulator configured to simulate a second model of a second subsystem of the modeled hardware implementation. The operations can include generating, from the second simulator executing the second model, a second data file specifying output of the second subsystem.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 9 illustrates an example of an intermediate data file as generated by a simulator of the simulation environment of FIG. 8.

FIG. 10 illustrates an example of hardware co-simulation.

DETAILED DESCRIPTION

This disclosure relates to simulation of circuit designs for integrated circuits (ICs) and, more particularly, to a computer-based simulation framework for system simulation using multiple simulators. In accordance with the inventive arrangements described within this disclosure, a simulation framework is provided that is capable of simulating the operation of a circuit design for implementation in an IC. The circuit design specifies a system that includes a plurality of different subsystems. The subsystems of the circuit design may be arranged in a pipeline.

The simulation framework communicatively links and/or coordinates operation of different simulators executing models of the different subsystems. To the extent that the different subsystems interact with one another as implemented within an IC, operation of the simulators may be coordinated in like manner by the simulation framework. For example, the output generated by a first simulator executing a model of a first subsystem of the circuit design may be fed to a second simulator. The second simulator executes a model of a second subsystem of the circuit design that is a data consumer of the first subsystem. The inventive arrangements may support highly complex systems with a plurality of inter-dependent (e.g., data sharing) subsystems.

By utilizing a simulation framework that supports the use of multiple simulators, different varieties of simulators may be used to simulate different subsystems of the circuit design. This allows different simulators to be used based on suitability of the particular simulator for a particular purpose and/or the suitability of a particular computer-readable programming language for creating a model of a subsystem to be simulated.

As noted, the simulation framework supports system-level simulation by coordinating the operation of the various simulators each executing a particular model of a subsystem of the circuit design. In other arrangements, however, the distributed nature of the simulation framework allows the simulation of a single subsystem of the circuit design or a subset of the subsystems of the circuit design in cases where system-level simulation is not necessary.

The inventive arrangements are generally described using a blockchain hardware system as the particular system, or circuit design, being simulated and modeled. It should be appreciated that the inventive arrangements may be applied to other technologies and is not intended to be limited to blockchain hardware systems and/or blockchain technologies in general. Further aspects of the inventive arrangements are described below with reference to the figures.

Figure 1:
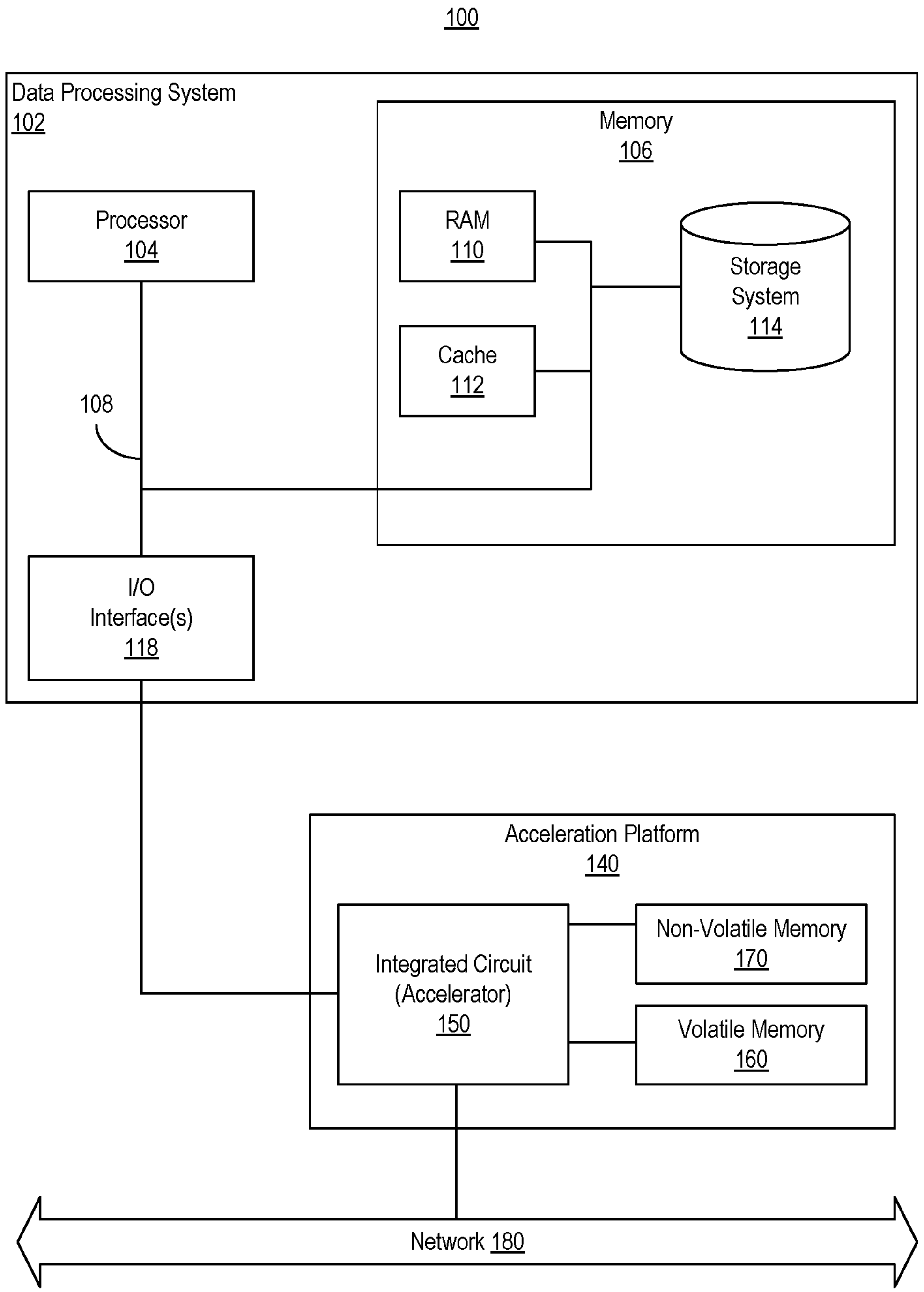
FIG. 1 illustrates an example of a computing environment including a network-attached accelerator.

FIG. 1 illustrates an example of a computing environment 100. Computing environment 100 includes a data processing system 102 communicatively linked to an acceleration platform 140.

As defined herein, the term "data processing system" means one or more hardware systems configured to process data, each hardware system including at least one processor and memory, wherein the processor is programmed with computer-readable instructions that, upon execution, initiate operations. The components of data processing system 102 can include, but are not limited to, a processor 104, a memory 106, and a bus 108 that couples various system components including memory 106 to processor 104.

Processor 104 may be implemented as one or more processors. In an example, processor 104 is implemented as a central processing unit (CPU). Processor 104 is implemented as one or more circuits capable of carrying out instructions contained in program code. Processor 104 may be an integrated circuit or embedded in an integrated circuit. Processor 104 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 108 represents one or more of any of a variety of communication bus structures. By way of example, and not limitation, bus 108 may be implemented as a Peripheral Component Interconnect Express (PCIe) bus. Data processing system 102 typically includes a variety of computer system readable media. Such media may include computer-readable volatile and non-volatile media and computer-readable removable and non-removable media.

Memory 106 can include computer-readable media in the form of volatile memory, such as random-access memory (RAM) 110 and/or cache memory 112. Data processing system 102 also can include other removable/non-removable, volatile/non-volatile computer storage media. By way of example, storage system 114 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 108 by one or more data media interfaces. Memory 106 is an example of at least one computer program product.

Memory 106 is capable of storing computer-readable program instructions that are executable by processor 104. For example, the computer-readable program instructions can include an operating system, one or more application programs, other program code, and program data. Processor 104, in executing the computer-readable program instructions, is capable of performing the various operations described herein that are attributable to a computer. It should be appreciated that data items used, generated, and/or operated upon by data processing system 102 are functional data structures that impart functionality when employed by data processing system 102. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 102 may include one or more Input/Output (I/O) interfaces 118 communicatively linked to bus 108. I/O interface(s) 118 allow data processing system 102 to communicate with one or more other devices including, but not limited to, acceleration platform 140. Examples of I/O interfaces 118 may include, but are not limited to, network cards, modems, network adapters, hardware controllers, etc.

Data processing system 102 is only one example implementation. Data processing system 102 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

The example of FIG. 1 is not intended to suggest any limitation as to the scope of use or functionality of example implementations described herein. Data processing system 102 is an example of computer hardware that is capable of performing the various operations described within this disclosure. In this regard, data processing system 102 may include fewer components than shown or additional components not illustrated in FIG. 1 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Acceleration platform 140 may be implemented as a circuit board that couples to data processing system 102. In the example, acceleration platform 140 includes an IC 150, a volatile memory 160 coupled to IC 150, and a non-volatile memory 170 also coupled to IC 150. Acceleration platform 140 may, for example, be inserted into a card slot, e.g., an available bus and/or PCIe slot, of data processing system 102 or be communicatively linked to data processing system 102 via another communication technology. In an example implementation, I/O interface 118 through which data processing system 102 communicates with acceleration platform 140 and IC 150 may be implemented as a Peripheral Component Interconnect Express (PCIe) adapter. In that case, acceleration platform 140 and IC 150 communicate with data processing system 102 via a PCIe communication link.

In one example, IC 150 may be implemented as a programmable IC. A programmable IC is an IC that includes at least some programmable circuitry. Programmable logic is an example of programmable circuitry. For example, IC 150 may be a Field Programmable Gate Array (FPGA). Other examples of programmable circuitry may include, but are not limited to, a programmable network-on-chip (NoC), a data processing array, or the like. In another example, IC 150 may be a System-on-Chip (SoC) or an adaptive hardware platform. Volatile memory 160 may be implemented as a RAM. Non-volatile memory 160 may be implemented as flash memory.

In the example shown, acceleration platform 140 and IC 150 are communicatively linked to a network 180. In one example, network 180 is an Ethernet type of network. Network 180 may operate at any of a variety of different speeds. In particular implementations, network 180 may be, include, or couple to, a 5G network. IC 150 includes an Ethernet interface (not shown) that is used to connect to, e.g., communicatively link, IC 150 to network 180. For example, IC 150 may be connected via network 180 to an Ethernet switch or one or more other network connected devices. For purposes of illustration, the term "network" refers to network 180 herein.

In the example of FIG. 1, acceleration platform 140 is a network-attached accelerator. A network-attached accelerator is a hardware accelerator in which data is received over a network by a network interface and is provided directly to the accelerator for processing rather than being first forwarded to a CPU. A network-attached accelerator may also be referred to as an "in-network" accelerator. By comparison, a CPU-centric accelerator is a hardware accelerator where data is received by the network interface, first flows to the CPU, and is then provided from the CPU to the hardware accelerator for processing.

A circuit design or system implemented within IC 150, e.g., an accelerator, may be simulated using the example simulation framework described herein. As part of a network-attached accelerator, a system implemented within IC 150, for example, may include a variety of different subsystems that interact with one another in a complex manner that would benefit from simulation using the inventive arrangements described herein.

Figure 2:
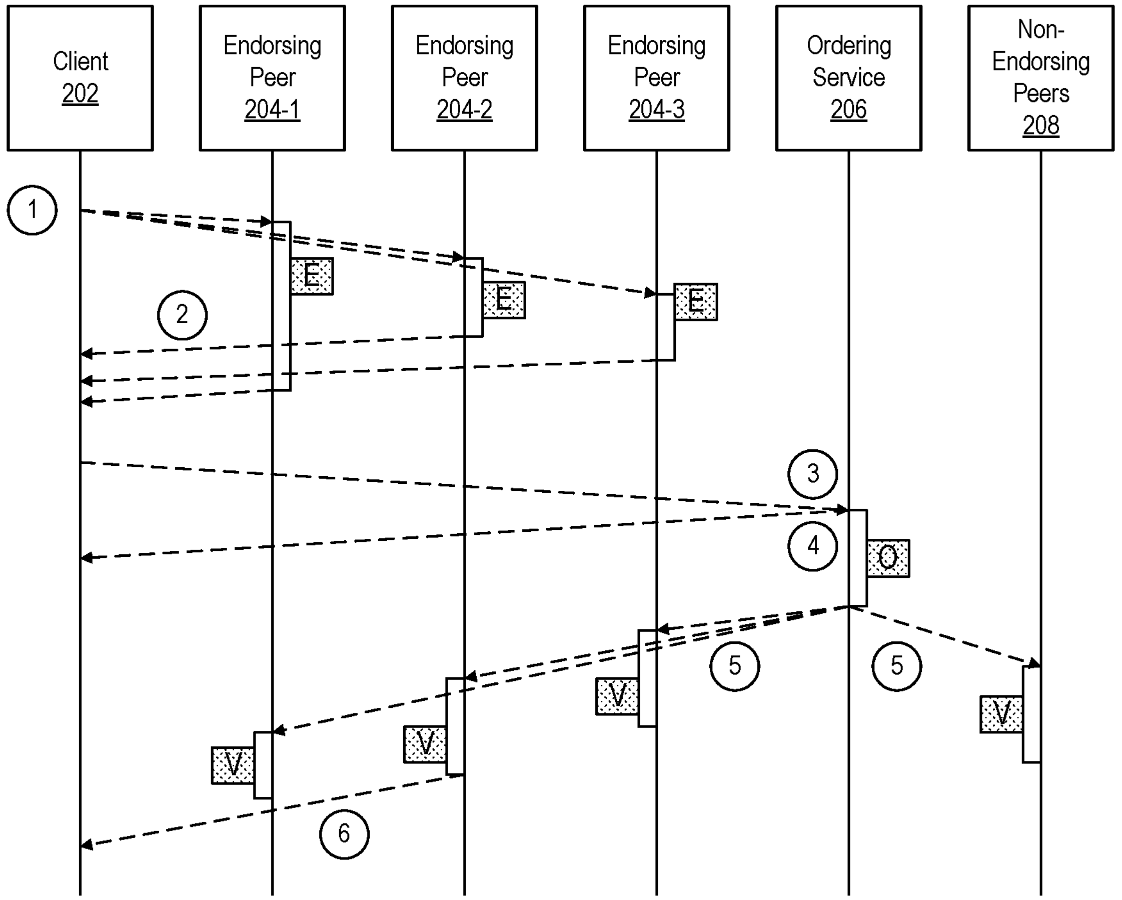
FIG. 2 illustrates an example of a computing environment configured to implement a permissioned blockchain.

FIG. 2 illustrates an example of a computing environment configured to implement a permissioned blockchain. For purposes of illustration, in the example of FIG. 2, the permissioned blockchain is Hyperledger Fabric. Hyperledger Fabric is an open-source, enterprise-grade implementation platform for permissioned blockchains. The example of FIG. 2 utilizes the execute-order-validate model where a transaction is executed first, then ordered into a block, and then validated and committed to the ledger along with a state database to keep the global state of the blocks committed thus far. The example of FIG. 2 illustrates the different types of computing nodes that may be included in a permissioned blockchain. The computing nodes, e.g., servers, virtual machines, containers, and the like, may implement peers, orderers, clients, and other entities in the permissioned blockchain, where each computing node has an identity provided by a Membership Service Provider (not shown).

In general, an endorsing peer 204 both executes and endorses transactions and validates and commits blocks to the ledger. A non-endorsing peer 208 only validates and commits blocks to the ledger. Execution of transactions is enabled by smart contracts referred to as chaincodes. The chaincodes are implemented as executable program code that represents business logic. Chaincodes may be instantiated on the endorsing peers.

An ordering service 206 consists of orderers which use a consensus mechanism to establish a total order for the transactions. A block is created from the ordered transactions and then broadcast to the peers. Multiple, different pluggable consensus mechanisms are available.

As illustrated in FIG. 2, a transaction may flow through the permissioned blockchain starting with step 1 where client 202 creates a transaction and sends the transaction to several endorsing peers 204. Each endorsing peer 204 executes the transaction against a state database maintained by the respective endorsing peer 204 to compute a read-write set of the transaction (e.g., illustrated in FIG. 2 as "E"). The "read set" are the keys that are accessed and their version numbers. The "write set" are the keys to be updated with new values. If there are no errors during the execution of the transaction, the endorsing peers 204 send back an endorsement to client 202 in step 2.

Once client 202 collects enough endorsements, client 202 submits the transaction with the received endorsements to ordering service 206 in step 3. Ordering service 206 responds back to client 202 after the transaction has been accepted for inclusion into a block in step 4. A block is created from the ordered transactions when either a user-configured timeout has expired or a user-configured limit on block size has been reached. Once a block is created (e.g., illustrated in FIG. 2 as "O"), ordering service 206 broadcasts the block to all endorsing peers 204 in step 5. The Gossip protocol may be used to broadcast the block. Each endorsing peer 204 validates all of the transactions of the block and then commits the block to the ledger and the state database (e.g., illustrated as "V"). One of the endorsing peers 204 sends a notification to client 202 that the transaction has been committed in step 6.

Figure 3:
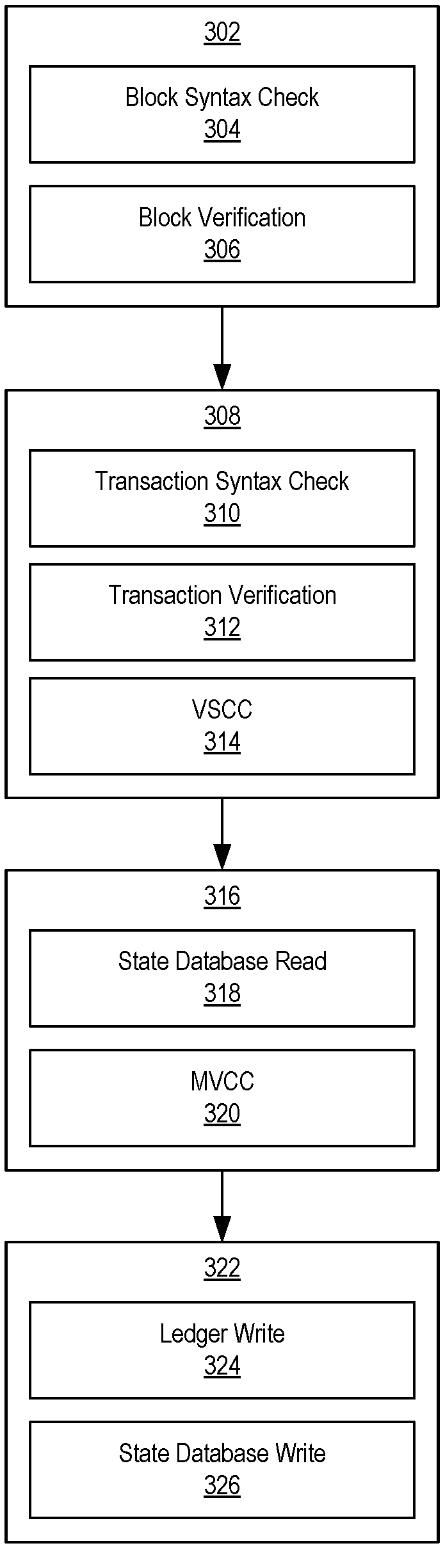
FIG. 3 illustrates example operations of a permissioned blockchain performed on a block as part of a validation phase.

FIG. 3 illustrates example operations of a permissioned blockchain performed on a block as part of a validation phase (e.g., step 5 of FIG. 2 and illustrated as "V"). Referring to 302, in response to receiving a block from the ordering service 206 or a lead peer, the computing node performs a block syntax check 304 by checking that the syntactic structure of the block is correct and performs a block verification 306 by verifying the signature of the block. In 308, the computing node performs a transaction syntax check 310 by checking that each transaction in the block is syntactically correct, performing transaction verification 312 by verifying the signature of each transaction of the block, and performing validation system chaincode (VSCC) 314 by running VSCC on each transaction where the endorsements are validated and the endorsement policy of the associated chaincode is evaluated. A transaction is marked as invalid if the endorsement policy of that transaction is not satisfied.

In 316, the computing node performs a state database read 318 and a multi-version concurrency control (MVCC) 320. The MVCC 320 ensures that there are no read-write conflicts between the valid transactions. That is, performing MVCC 320 avoids the double-spending problem. The read set of each transaction is computed again by accessing the state database. The read set of each transaction, as read from the state database, is compared to the read set from the endorsement phase. If the read sets are different, then some other transaction in this block or from an earlier block has already modified the same keys thereby causing the computing node to mark the transaction as invalid.

In 322, the block is committed. The computing node performs a ledger write 324 by writing the entire block to the ledger with the valid/invalid flags for the transactions. The computing node performs state database write 326 by writing or committing the sets of the valid transactions to the state database.

Figure 4:
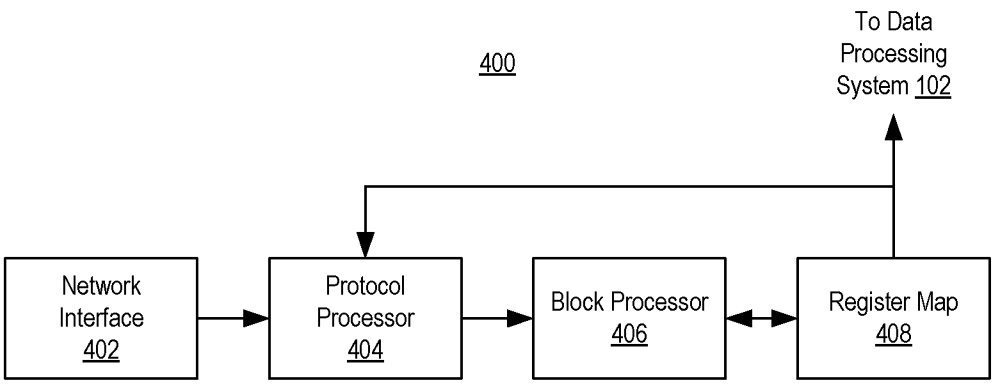
FIG. 4 illustrates an example circuit architecture for the network-attached accelerator of FIG. 1.

FIG. 4 illustrates an example circuit architecture 400 of the network-attached accelerator of FIG. 1. More particularly, circuit architecture 400 is an example of a blockchain accelerator. Circuit architecture 400 may be implemented in IC 150 of the acceleration platform 140. In one aspect, circuit architecture 400 is capable of performing one or more of the operations illustrated for a peer as described in connection with FIGS. 2 and/or 3.

For example, architecture 400 is capable of performing the following operations: receiving packets from a remote orderer; processing the packets and determining data fields based on the structure of a block; reformatting data fields as block tasks and transaction tasks; and pushing the results to a pipeline implemented therein. Circuit architecture 400 further is capable of performing tasks such as: verifying transactions and blocks; updating the state database according to the transactions; generating block processing results; and collecting the processing results from software (e.g., data processing system 102).

As pictured, circuit architecture 400 includes a network interface 402, a protocol processor 404, a block processor 406, and a register map 408. The example circuit architecture 400 is capable of receiving blocks, including transactions, in hardware directly from network 180 via network interface 402. The blocks may be validated through a configurable and efficient block-level and transaction-level pipeline implemented by protocol processor 404 and block processor 406. The validation results are then transferred to processor 104 of data processing system 102 via register map 408. In one aspect, particular operations that are the source of bottlenecks in data processing system 102 may be performed by circuit architecture 400.

Protocol processor 404 is capable of processes all the incoming Ethernet packets from network 180 and classifying the packets as normal packets or blockchain packets. Normal packets are packets that architecture 400 forwards to the data processing system 102 for processing without any modification to the packets. Such packets may be forwarded by protocol processor 404 without traversing through the remainder of circuit architecture 400. Blockchain packets are packets that are to be processed through circuit architecture 400. Protocol processor 404 is capable of extracting relevant data from those packets determined to be blockchain packets and forwarding the extracted data to block processor 406.

Block processor 406 is capable of accessing data from different buffers in parallel and executing as many operations of the validation phase as possible in parallel. The operations also may be pipelined for high throughput. For example, block processor 406 is capable of performing operations such as block verification 306, transaction verification 312, VSCC 314, MVCC 320, and/or state database write 326 in the form of an integrated block-level and transaction-level pipeline.

Having processed a whole block, block processor 406 is capable of writing the processed block to a buffer (e.g., a first-in-first-out or FIFO buffer) that may be read by the next processing circuit and/or subsystem in the pipeline. Register map 408 writes the results from the buffer(s) into multiple registers therein in a format more suitable for software running on the data processing system 102 to fetch the data. In one aspect, processor 104 is capable of accessing data from register map 408 by way of a communication protocol that operates over PCIe.

Figure 5:
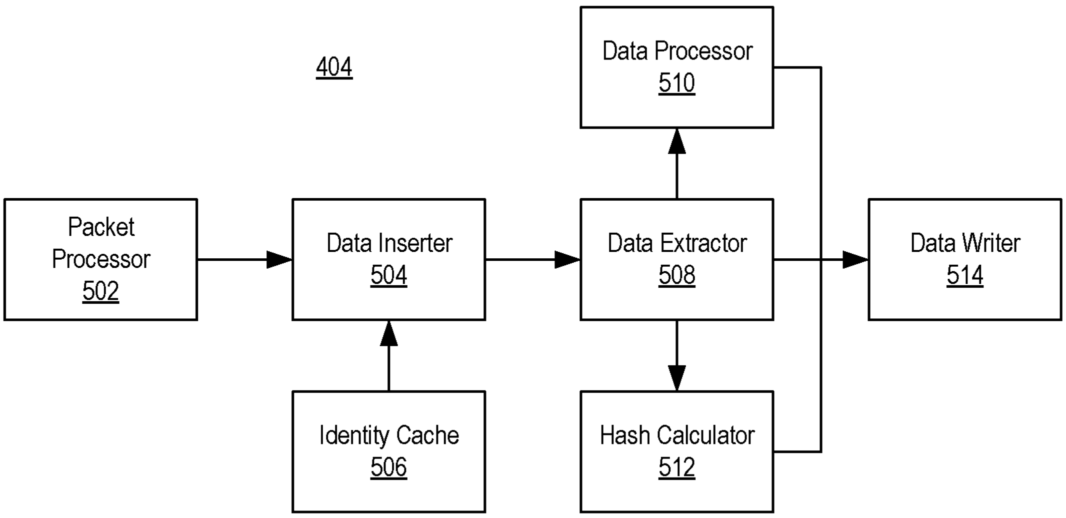
FIG. 5 illustrates an example architecture for the protocol processor of FIG. 4.

FIG. 5 illustrates an example circuit architecture for the protocol processor 404 of FIG. 4. Protocol processor 404 includes a packet processor 502, a data inserter 504, an identity cache 506, a data extractor 508, a data processor 510, a hash calculator 512, and a data writer 514.

Packet processor 502 is capable of filtering packets based on information contained in the packet headers. For example, packet processor 502 is capable of filtering out, or selecting, packets that are to be processed through circuit architecture 400 based on data contained in the L3 header. The L3 header may include a User Datagram Protocol (UDP) having a predefined port number. Packet processor 502, in response to detecting a packet with a UDP having the predefined port number, routes the packet through circuit architecture 400. If the packet does not have a UDP having the predefined port number, packet processor 502 routes the packet to the data processing system 102 (e.g., directly to data processing system 102 without traversing through the remainder of circuit architecture 400).

In addition, for each of the packets determined to have a UDP with the predetermined port number, packet processor 502 is capable of further parsing the header of the packet. Packet processor 502 is capable of parsing the L7 header of the packet to retrieve any annotations specified therein.

Packet processor 502 is capable of forwarding locator annotations that have been retrieved along with the packet payload to data inserter 504. Data inserter 504 uses the encoded identifiers (IDs) from the locator annotations to look up the original identities from a hardware-based identity cache 506. Identity cache 506 may be initialized and updated by the sender whenever a new identity is encountered.

Data extractor 508 is capable of using the pointer annotations and the reconstructed section data to extract relevant data fields. Data extractor 508 is capable of generating three types of outputs. These outputs include (1) data fields such as block number, transaction number, etc., which can be used directly and are passed to data writer 514; (2) data fields such as signatures, endorsements, etc., which need further processing and are passed to data processor 510; and (3) data fields that are needed for hash calculations and are passed to hash calculator 512.

Data processor 510 internally uses a variety of postprocessors to further extract relevant data. For example, data processor 510 is capable of encoding Elliptic Curve Digital Signature Algorithm (ECDSA) signatures in digital signatures in binary format (DER). Data processor 510 also may include data processors capable of extracting a public key from certificates and a decoder capable of extracting endorsements, read sets, and write sets.

Hash calculator 512 may include a plurality, e.g., three, stream-based SHA-256 hash calculator circuits. The calculator circuits are capable of computing (1) a block hash over block data (e.g., header and all transaction sections); (2) the hash of each transaction over the section of that transaction; and (3) the hash of each endorsement over the endorsement data of the transaction section. These hashes are used by ECDSA verification hardware.

Data writer 514 is capable of collecting the data needed by block processor 406 and writing the data to various FIFO buffers. Data writer 514 pushes the data to the selected FIFO buffers. The FIFO buffers to which data writer 514 writes and from which block processor 406 obtains data include a BLOCK FIFO, a TX FIFO, an ENDS FIFO, a RDSET FIFO, and a WRSET FIFO.

Figure 6:
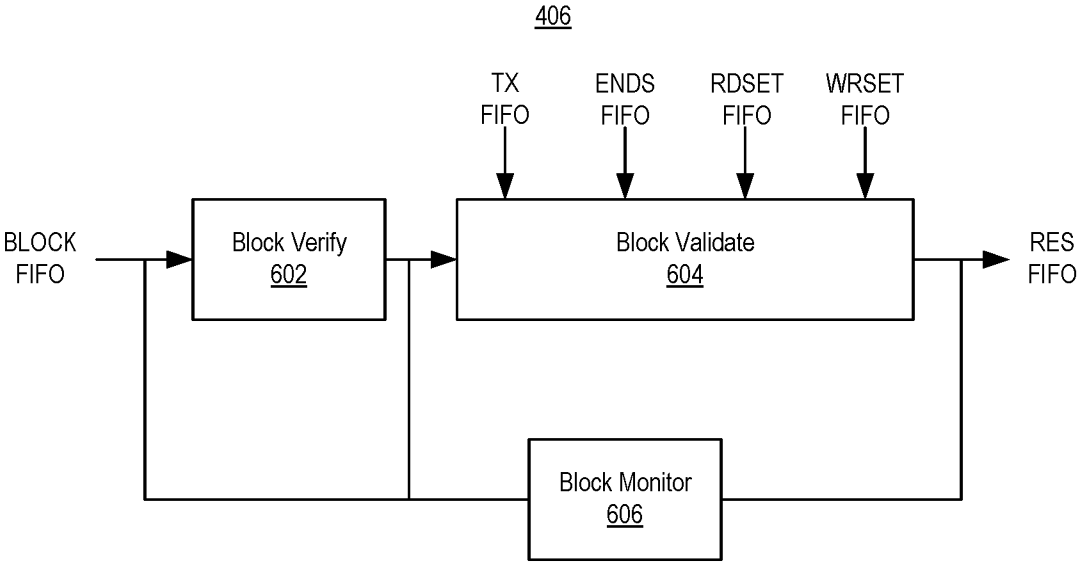
FIG. 6 illustrates an example architecture for the block processor of FIG. 4.

FIG. 6 illustrates an example architecture for block processor 406 of FIG. 4. Block processor 406 is configured to process blocks quickly to provide high throughput. Block processor 406 is capable of processing multiple blocks in parallel where each parallel processing channel is pipelined. Block processor 406 is designed as an integrated block-level and transaction level pipeline.

In the example of FIG. 6, block processor 406 includes a block verify circuit 602, a block validate circuit 604, and a block monitor circuit 606. In general, block processor 406 is organized as a 2-stage block-level pipeline in which the block verify circuit 602, as a first stage, verifies a block by reading the verification request from the BLOCK FIFO. Block validation circuit 604 receives data from the TX FIFO, ENDS FIFO, RDSET FIFO, and the WRSET FIFO. Block validation circuit 604 is capable of validating all the transactions of a block, committing the valid transactions of the block, and writing to the RES FIFO (e.g., output) after the entire block has been processed. The statistics written to RES FIFO are collected by block monitor circuit 606, which is capable of monitoring the FIFO buffers and interfaces of the two stages to track the time spent performing various operations. In general, the block processor 406 is capable of processing two blocks at a time in pipelined fashion.

Figure 7:
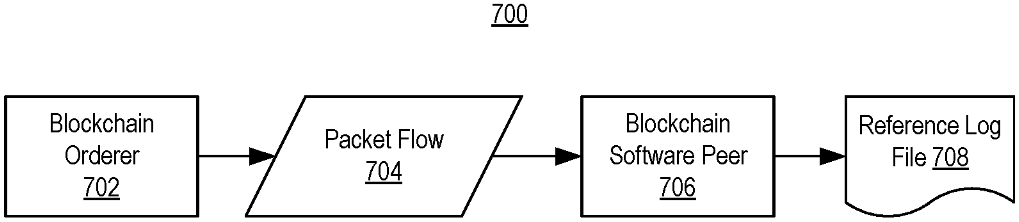
FIG. 7 illustrates an example of a software-based system including a reference software system.
Figure 8:
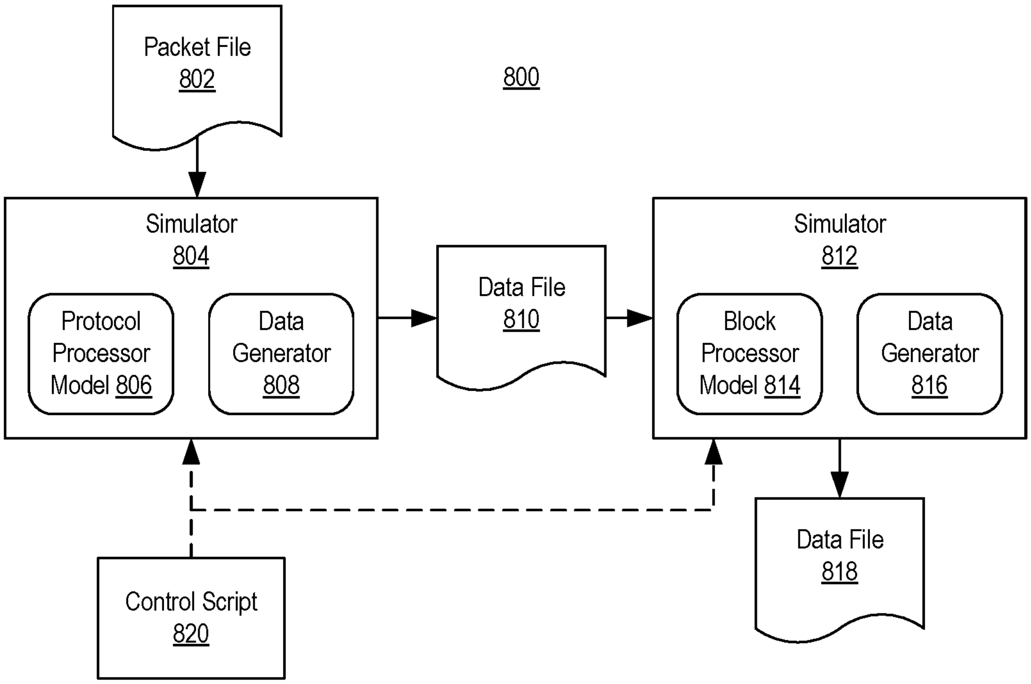
FIG. 8 illustrates an example of a simulation framework that is capable of simulating a network-attached accelerator using multiple simulators.

FIGS. 7-8 illustrate various aspects of a simulation framework for circuit architecture 400 of FIG. 4. Complex systems such as that of circuit architecture 400 include a variety of internal subsystems. These subsystems may include internal modules specifying hardened Intellectual Property (IP) cores, soft IP cores, High-Level Synthesis (HLS) program code, Hardware Description Language (HDL) (e.g., Verilog) modules, and the like.

The heterogeneity of the different types of subsystems makes simulating such a system exceedingly difficult and intricate. For example, in the case of circuit architecture 400, certain operations such as interacting with network 180, data processing system 102, performing database accesses, and the like lead to use cases or scenarios that cannot be captured through module (e.g., subsystem) level simulation. Rather, it is often the case that system-level simulation is needed to reproduce failures for debugging during the development of the system.

FIG. 7 illustrates an example of a software-based system 700 including a reference software system. Software-based system 700 may be implemented in a data processing system such as the data processing system 102 of FIG. 1. In this example, the acceleration platform 140 is not needed. In the example of FIG. 7, the software-based system 700 includes a blockchain orderer 702 (e.g., ordering service 206) that generates a packet flow 704 that is provided to a blockchain software peer 706. Blockchain software peer 706 is an example of a reference software system. Blockchain software peer 706 outputs generated results in the form of a reference log file 708. Blockchain software peer 706 may be a software version of certain functions that are hardware accelerated using the example circuit architecture 400 of FIG. 4.

In general, reference log file 708 is considered the "ground truth" to which any other simulation and/or hardware co-simulation results are compared. Reference log file 708 may specify information including, but not limited to, host information such as Internet Protocol port; block information such as block identifier, block size, transactions included, and orderer information; transaction information such as TX identifier, database access information, and signatures; and validation results of block and transactions of blocks.

In one aspect, the simulation framework includes a software component that captures the packet flow 704 from blockchain orderer 702 to blockchain software peer 706. The packet flow 704 may be captured and stored in a file. In another aspect, the packet flow 704 may be captured by a program code/software that is not part of the simulation framework. For example, packet flow 704 may be captured into a data file using a utility such as Tcpdump (e.g., a native Linux utility) that may store the data as one or more PCAP files. A PCAP file is a data file that contains packet data of a network and that may be used to analyze network characteristics.

The captured packet flow 704 may be used in subsequent stages for simulating certain aspects of software-based system 700. Reference log file 708 is also captured and stored for use in determining whether simulated results match the results generated by blockchain software peer 706 (e.g., the reference software system). Reference log file 708 is viewed as the correct, or "golden" reference for subsequent comparisons to determine whether simulation results of the modeled hardware implementation are accurate.

FIG. 8 illustrates an example of a simulation framework 800 that is capable of simulating a network-attached accelerator using multiple simulators. Simulation framework 800 may be implemented in a data processing system such as data processing system 102 of FIG. 1. In this example, the acceleration platform 140 is not needed. In the example of FIG. 8, the network-attached accelerator is a hardware version of the blockchain software peer 706 and, in particular, circuit architecture 400 of FIG. 4. In the example of FIG. 8, the captured packet flow 704 has been stored as a packet file 802 that may be provided to a simulator 804. For example, packet file 802 may be a PCAP file. Using data from packet file 802 within simulation framework 800 means that real, actual data from the software-based system 700 is fed into simulation framework 800 as opposed to manually generating input data for purposes of simulation. Further, though the data is real, the data may be fed into simulation framework 800 asynchronously unlike an actual packet stream.

Simulator 804 executes a protocol processor model 806. Simulator 804 may include a data generator 808 that is capable of receiving data output from execution of protocol processor model 806 and generating an output in the form of a data file 810. For example, data generator 808 may decode the received data to create data file 810. Data file 810 may store intermediate data generated through simulation, e.g., execution of, protocol processor model 806. Data file 810 is specified in a human-readable format. Human-readable format is an encoding of data or information that can be naturally read by a human being. An example of human-readable data is data encoded in ASCII or unicode text as opposed to binary data.

Data file 810 is provided to simulator 812. Simulator 812 executes a block processor model 814. Simulator 812 may include a data generator 816 that is capable of receiving data output from execution of block processor model 814 and generating an output in the form of data file 818. For example, data generator 816 may decode the received data to create data file 818. Data file 818 also may be specified in human-readable format.

In the example of FIG. 8, each of data generators 808 and 816 is capable of translating raw data, e.g., signal data and/or variable values, from execution of models 806, 814, respectively, into human-readable form. For example, each of the data generators 808, 816 is capable of translating binary formatted data into human-readable form.

In one or more example implementations, the human-readable data of data files 810, 818 may specify data that is encoded at one or more layers of the Open Systems Interconnection (OSI) model. For example, the data contained in data files 810, 818 may include presentation layer data, application layer data, and/or a combination of data from two or more different layers of the OSI model. Thus, the data may be specified at the application layer, at the presentation layer, and/or specify data from both the application layer and the presentation layer combined.

As known, the application layer may be used by end-user software. The application layer provides protocols that allow software to send and receive information and present meaningful data to users. The presentation layer prepares data for the application layer. The presentation layer defines how two devices should encode, encrypt, and compress data so the data is received correctly on the other end. The presentation layer takes any data transmitted by the application layer and prepares that data for transmission over the session layer.

In the example of FIG. 8, simulator 804 may be implemented as a simulator that is capable of executing one or more models created using a high-level programming language such as C/C++. The models, e.g., protocol processor model 806, may be executable (e.g., compiled) models. That is, protocol processor model 806 may be specified in such a high-level programming language that is compiled and then executed by simulator 804.

Simulator 812 may be implemented as a simulator that is capable of executing one or more models specified in a hardware description language (HDL) such as Verilog and/or VHDL. Accordingly, block processor model 814 may be specified in an HDL.

In the example of FIG. 8, operation of simulation framework 800 may be coordinated by execution of a control script 820. Control script 820 may initiate execution of simulator 804 and specify packet file 802 as the input thereof. Control script 820 may also initiate execution of simulator 812 and specify data file 810 as the input thereto.

In one or more other example implementations, simulation framework 800 may be implemented with a greater degree of granularity. For example, each of the different constituent blocks of protocol processor 404 and/or of block processor 406 may be simulated as separate models. In some cases, additional simulators may be used. For example, each model may execute in its own simulator. Alternatively, one or more models may execute in the simulators.

For example, packet processor 502 of protocol processor 404 may be modeled using Programming Protocol-independent Packet Processors (P4). An additional simulator may be included that is adapted to execute models specified in P4. That simulator may generate a data file (e.g., using another data generator) that is specified in human-readable form and to provide information encoded at a particular level or levels of the OSI model. The data file may be provided to simulator 804, which executes models of the remaining components of protocol processor 404. Communication among the simulators also may be facilitated by each of the various models generating a data file that is specified in human-readable format. The various data files exchanged between the simulators may be standardized. Thus, a chain of simulators, at any level of granularity, are capable of executing in a pipelined manner. Further, the simulation environment 800, when take as a whole, need not operate in a cycle accurate manner.

In the example of FIG. 8, where simulation framework 800 simulates operation of a blockchain accelerator, data file 810 may store information such as validation results of blocks and transactions of blocks. Data file 810 may also specify other block details and/or transaction details. In providing the data from data file 810 to simulator 812, the data may be reformatted to fit or conform to the input interfaces of block processor model 814. Data file 818 can include the validation results generated by block processor model 814 as translated into human-readable form by data generator 816.

Any of the various file(s) generated by simulation framework 800, e.g., data file 810 and/or data file 818, may be stored for re-use. Once a particular data file is generated and stored, simulation framework 800 may re-use that data file to re-run a simulation of a particular subsystem of the larger system. In the example of FIG. 8, once data file 810 is generated, data file 810 may be provided to simulator 812 executing block processor model 814 to re-run the simulation of that subsystem without having to first run a simulation of protocol processor 404.

The data files generated (e.g., data file 810 and/or data file 818) may be shared with different simulators. As discussed, being specified in human-readable form, the data files that are generated do not contain raw signal or interface values output by the respective subsystems. Instead, the data files include human-readable text that indicates the meaning of the structural data captured from execution of the models as simulated. In the example of FIG. 8, data file 818 may include, or specify, host information (e.g., information for data processing system 102), block information, transaction information, validation result flag(s), and the like.

In another aspect, simulation framework 800, by using multiple different simulators as described, allows different subsystems of the larger system to be simulated in a linked manner, but also separately. This also means that each subsystem may be simulated with a different simulation speed. Simulator 804, for example, may execute protocol processor model 806, being a compiled high-level programming language model, with greater speed than simulator 812 is capable of executing block processor model 814, which may be an HDL model.

Simulation framework 800, by using separate simulators, also leads to reduced simulation times. For example, were the models being simulated included in a single larger simulator, e.g., a Register Transfer Level (RTL) simulator or other HDL simulator, the resulting simulation would be exceedingly complex and take significant time to complete compared with the multi-simulator approach of simulation framework 800. Thus, simulation framework 800 is capable of executing the models and performing simulation in less time than would be required were the entire hardware system modeled using HDL, for example. The debug tools available in each of the respective simulators may be utilized natively.

While FIG. 8 is described in the context of a blockchain accelerator, it should be appreciated that the inventive arrangements described herein may be applied to simulate any of a variety of different network-attached accelerators. Such architectures are characterized by the inclusion of a network processor (e.g., processor 104) and one or more hardware accelerators (e.g., IC 150). Another example of a network-attached accelerator that may be simulated using the inventive arrangements described herein is a Network Interface Card (NIC) accelerator.

The inventive arrangements may also be utilized to simulate heterogeneous computing systems. Heterogeneous computing systems are characterized by the use of multiple subsystems connected by a network and/or local interfaces such that simulation of the various subsystems, without the use of simulation framework 800 or the inventive arrangements described herein would have to be performed separately (e.g., simulate the subsystems separately and not the larger system as a system-level simulation).

To determine whether the hardware being modeled is accurate, simulation framework 800 is capable of comparing reference log file 708 with data file 818. In another example, simulation framework 800 may compare data file 810 with reference log file 708. For example, the control script 820 may automatically compare reference log file 708 with data file 818 and/or automatically compare reference log file 708 with data file 810.

FIG. 9 illustrates an example of data file 810 as generated by simulator 804. The example of FIG. 9 illustrates how data generator 808 translates any received signal information generated by executing protocol processor model 806 into human-readable form. The data specified in human-readable form, e.g., in intermediate data file 810, is specified at a higher level of abstraction than a data file that specifies raw signals, raw packet data, and/or protocol level data.

As noted, in one or more example implementations, the human-readable data included in the example of FIG. 9 may specify data that is encoded at one or more layers of the Open Systems Interconnection (OSI) model. For example, the data contained in the example of FIG. 9 may include presentation layer data, application layer data, and/or a combination of data from two or more different layers of the OSI model.

In one or more example implementations, data included in data file 810 and/or 818, as created by a data generator, may include a summary of the data contained therein, may omit certain data, and/or may expand on or elaborate on certain data.

Referring to FIG. 9, lines 1-3, for example, indicate that for block 1, a new packet has been received. The packet is a first in a series. The total size of the packet is 75 bytes. Lines 5-6 indicate that a next packet 2 has been received for block 1. The sequence of 0 indicates that the packet is for the first transaction in the block. The series number of the block is 2. The total size of the packet is 1127 bytes.

In general, the data generators are capable of obtaining raw data output from a simulated model, and encoding the data to indicate higher level data in human-readable form. The data, for example, may indicate the particular ports over which messages are conveyed, the messages conveyed, and/or other information.

Referring again to FIG. 9, lines 8-9 and 11-13 specify the names “db_rd_task” and “db_wr_task” for ports (e.g., interfaces) between protocol processor 404 and block processor 406. Lines 8-9 and 11-13 specify particular ports over which messages are conveyed. Following each port name is the particular message conveyed on that port as specified within the “{ }”. Referring to the message conveyed on the “db_rd_task” port, the message specifies the key number, the history/block identifier, and the history/tx_id, and the collection name. Referring to the message conveyed on the “db_wr_task” port, the message specifies similar information. In general, the raw data is translated into domain-specific data in human-readable form for the particular hardware accelerator being simulated. In this case, the domain is permissioned blockchains.

The remaining lines specify further messages conveyed on additional ports such as the “endorser_task” port and the “transaction_task” port. Two messages are conveyed on the endorser_task port. In this example, the “endorser_task” and the “transaction_task” may be named FIFO memories of the circuit design being simulated that are incorporated into the intermediate results.

In one or more examples, the particular ports described within data file 810 may correspond, or specify, the particular FIFO memory to which the data is written. For example, the various example ports described may map onto the BLOCK FIFO, TX FIFO, ENDS FIFO, RDSET FIFO, and WRSET FIFO. The particular name of the port within the portion of the circuit design and/or model being simulated may be used in the data file 810. In other cases, however, there need not be a one-to-one correspondence between ports of the subsystems being simulated and the ports and/or messages of the data files including intermediate data.

As an illustrative example, the data of FIG. 9 does not include the actual data of the first packet. This aspect illustrates how the data generator is capable of summarizing the data to specify attributes of the data while omitting the actual data from the data file. Subsequent entries in the example of FIG. 9 explicitly describe specific data packets contained in particular ports (e.g., FIFO memories). For example, the endorser_task or the db_read_task may map onto, or represent, a particular one of the FIFO memories described that connect protocol processor 404 with block processor 406. Certain details of the data packets, as specified on the ports, may be provided such as "signature_r" and/or "signature_s" along with relevant data in a specific format that, in this example, conforms to the presentation layer in the OSI model.

The example of FIG. 9 is characterized by the encoding of data in a human readable format, the summarization of data (and/or omission of data), the indication of particular messages and port/interface names from the circuit design. These features are illustrative of the higher level of abstraction (e.g., application layer) that may be provided by the simulation framework 800. These features also are illustrative of the ability of the simulation framework 800 to mix and match multiple levels of abstraction (e.g., the application layer data with the presentation layer data, etc.) in the same data file.

In one or more example implementations, the data of the data file 810 and/or data file 818 may be edited at this higher level without modifying the raw data for purposes of debugging. By allowing the human readable data to be edited, standard debugging actions may be performed such as forcing certain variables to specific values before continuing the simulation. For purposes of illustration, consider the blockchain example. In a blockchain simulation/debug environment, because each block typically has a hash and a block identifier that depends on the previous block, removal or modification of earlier blocks requires the subsequent block(s) to be modified as well.

By allowing the human readable data to be edited and then re-injected into the simulation framework (e.g., to simulator 812) the simulation time may be reduced since data file 810 may be edited to start from a selected block "N" of a long input trace of blocks by removing some of the earlier data and modifying specific elements of block N. For example, data file 810 may be edited to remove one or more earlier blocks and edit the hash value and block identifier of block N to be consistent with the fact that previous blocks have been removed from data file 810.

Example 1 illustrates an example of the contents of data file 818.

Example 1

Block [1] transaction validation flags: 0X00000000 0X00000000 0X00000000 0X00000000 0X00000000 0X00000000 0X00000000 0X00000001

In Example 1, data file 818 indicates transaction validation flags for block 1. In the example, only one transaction is valid as illustrated by the "0X00000001" value. As can be seen, the data generator includes the explanatory text in human-readable form that provides domain-specific context for the data.

FIG. 10 illustrates an example of hardware co-simulation. In the example of FIG. 10, circuit architecture 400 may be implemented in IC 150. For example, the circuit design specifying circuit architecture 400 may be synthesized, placed, and routed with the resulting configuration data being loaded into IC 150 to physically realize circuit architecture 400 therein. Packet flow 704, as captured in packet file 802, may be played to IC 150 (e.g., as disposed in acceleration platform 140) via network 180. IC 150 may communicate via PCIe with a software agent 1002 executing in data processing system 102 (e.g., a "host software agent). Software agent 1002 is capable of performing any processing as described herein that is not performed by circuit architecture 400 in IC 150 and generate a data file 1004. The data file 1004 may be specified in human-readable form as previously described herein.

In accordance with the inventive arrangements described herein, control script 820, or other executable program code, may be executed by a data processing system to automatically compare data file 808 and/or 818 of FIG. 8 from simulation with the reference log file 708 of FIG. 7 from the reference software system. In another example, control script 820 or other executable program code may be executed to automatically compare data file 1004 of FIG. 10 from hardware co-simulation with reference log file 708. Based on detecting differences between the data files and the reference log file, errors in behavior of the models as simulated and/or as hardware co-simulated relative to the reference software system may be detected. Debugging may be performed to address the detected differences.

Figure 11:
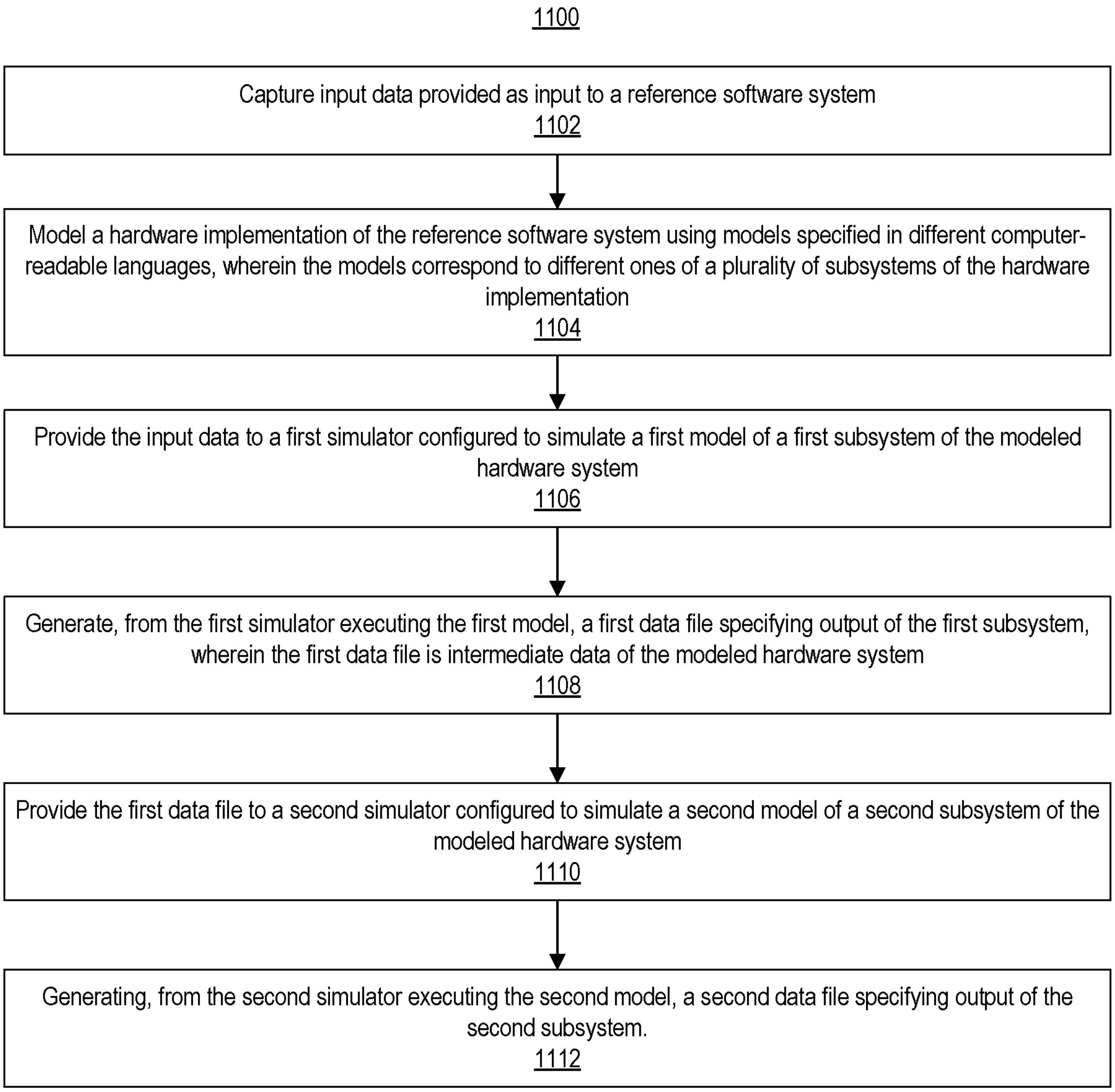
FIG. 11 is a flow chart of an example method illustrating certain operative features of a simulation framework in accordance with the inventive arrangements described herein.

FIG. 11 is a flow chart of an example method 1100 showing certain operative features of a simulation framework in accordance with the inventive arrangements disclosed herein. The simulation framework may be executed by a data processing system such as data processing system 102 of FIG. 1. An acceleration platform 140 may be used in cases where hardware co-simulation is performed but is not required for performing simulation of a network-connected accelerator.

In block 1102, input data provided as input to a reference software system is captured. The input data may be captured by a component of the simulation framework or by another software component that executes with the reference software system. As noted, the captured input data may be stored in packet file 802.

In block 1104, a hardware implementation of the reference software system is modeled using models specified in different computer-readable programming languages. The models correspond to different ones of a plurality of subsystems of the hardware implementation. An example of a hardware implementation is circuit architecture 400 of FIG. 4.

In block 1106, the input data as captured in packet file 802 is provided to a first simulator (e.g., simulator 804) configured to simulate a first model of a first subsystem of the modeled hardware implementation. In block 1108, the first simulator executing the first model generates a first data file (e.g., data file 810) specifying output of the first subsystem. The first data file specifies intermediate data of the modeled hardware implementation.

In block 1110, the first data file is provided to a second simulator (e.g., simulator 812) configured to simulate a second model of a second subsystem of the modeled hardware implementation. In block 1112, the second simulator executing the second model generates a second data file (e.g., data file 818) specifying output of the second subsystem.

The foregoing and other implementations can each optionally include one or more of the following features, alone or in combination. Some example implementations include all the following features in combination.

In one aspect, the hardware implementation is a network-attached accelerator.

In another aspect, the hardware implementation is configured to perform blockchain transaction processing. The blockchain transaction processing may be a permissioned blockchain system.

In another aspect, output data generated by the reference system can be captured. The second data file can be compared with the output data. A determination can be made as to whether the modeled hardware implementation behaves as designed based on the comparing.

In another aspect, the first and second data files are in human-readable format.

In another aspect, the first model is specified in a high-level programming language. The first simulator is capable of executing the first model to perform packet processing on the input data. The second model is specified, at least in part, in a hardware description language. The second simulator is capable of executing the second model to perform one or more blockchain operations.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer-readable storage medium" means a storage medium that contains or stores program code for use by or in connection with an instruction execution system, apparatus, or device. As defined herein, a "computer-readable storage medium" is not a transitory, propagating signal per se. A computer-readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer-readable storage media. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "output" means storing in physical memory elements, e.g., devices, writing to display or other peripheral output device, sending or transmitting to another system, exporting, or the like.

As defined herein, the term "real-time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc., may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "computer-readable program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:

modeling a hardware implementation of a reference software system using models that correspond to different ones of a plurality of subsystems of the hardware implementation;

simulating, by a first simulator, an executable model of a first subsystem of the plurality of subsystems that implements a protocol processor configured to classify packets of input data as normal packets forwarded directly to a host data processing system and block chain packets requiring further processing by the hardware implementation;

generating, from the first simulator executing the executable model, a first data file specifying output of the first subsystem, wherein the first data file specifies intermediate data generated by the executable model;

simulating, by a second simulator, a register transfer level model of a second subsystem of the plurality of subsystems that implements a block processor coupled to the protocol processor and configured to implement block and transaction verification operations on the first data file; and generating, from the second simulator executing the register transfer level model, a second data file specifying output of the second subsystem;

wherein the first data file and the second data file are specified in human-readable text.

2. The method of claim 1, wherein the hardware implementation is a network-attached accelerator.

3. The method of claim 2, wherein the hardware implementation is configured to perform blockchain transaction processing.

4. The method of claim 1, wherein at least one of the first data file or the second data file specifies particular ports of the hardware implementation over which data specified by the first data file or the second data file is conveyed.

5. The method of claim 1, further comprising:

capturing output data generated by the reference software system;

comparing the second data file with the output data; and determining whether the hardware implementation behaves as designed based on the comparing.

6. The method of claim 1, further comprising:

editing at least one of the first data file or the second data file by removing one or more blocks therein and editing a hash value and a block identifier to be consistent with the removing of the one or more blocks.

7. The method of claim 1, wherein at least one of the first data file or the second data file is encoded to specify data at a selected layer of an Open Systems Interconnect (OSI) model.

8. A system, comprising:

a processor configured to initiate operations including:

modeling a hardware implementation of a reference software system using models that correspond to different ones of a plurality of subsystems of the hardware implementation;

simulating, by a first simulator, an executable model of a first subsystem of the plurality of subsystems that implements a protocol processor configured to classify packets of input data as normal packets forwarded directly to a host data processing system and block chain packets requiring further processing by the hardware implementation;

generating, from the first simulator executing the executable model, a first data file specifying output of the first subsystem, wherein the first data file specifies intermediate data generated by the executable model;

simulating, by a second simulator, a register transfer level model of a second subsystem of the plurality of subsystems that implements a block processor coupled to the protocol processor and configured to implement block and transaction verification operations on the first data file; and generating, from the second simulator executing the register transfer level model, a second data file specifying output of the second subsystem;

wherein the first data file and the second data file are specified in human-readable text.

9. The system of claim 8, wherein the hardware implementation is a network-attached accelerator.

10. The system of claim 9, wherein the hardware implementation is configured to perform blockchain transaction processing.

11. The system of claim 8, wherein at least one of the first data file or the second data file specifies particular ports of the hardware implementation over which data specified by the first data file or the second data file is conveyed.

12. The system of claim 8, wherein the processor is further configured to initiate operations comprising:

capturing output data generated by the reference software system;

comparing the second data file with the output data; and determining whether the hardware implementation behaves as designed based on the comparing.

13. The system of claim 8, wherein the processor is further configured to initiate operations comprising:

editing at least one of the first data file or the second data file by removing one or more blocks therein and editing a hash value and a block identifier to be consistent with the removing of the one or more blocks.

14. The system of claim 8, wherein at least one of the first data file or the second data file is encoded to specify data at a selected layer of an Open Systems Interconnect (OSI) model.

15. A computer program product, comprising:

one or more computer-readable storage media, and program instructions collectively stored on the one or more computer-readable storage media, wherein the program instructions are executable by computer hardware to initiate operations including:

modeling a hardware implementation of a reference software system using models that correspond to different ones of a plurality of subsystems of the hardware implementation;

simulating, by a first simulator, an executable model of a first subsystem of the plurality of subsystems that implements a protocol processor configured to classify packets of input data as normal packets forwarded directly to a host data processing system and block chain packets requiring further processing by the hardware implementation;

generating, from the first simulator executing the executable model, a first data file specifying output of the first subsystem, wherein the first data file specifies intermediate data generated by the executable model;

simulating, by a second simulator, a register transfer level model of a second subsystem of the plurality of subsystems that implements a block processor coupled to the protocol processor and configured to implement block and transaction verification operations on the first data file; and generating, from the second simulator executing the register transfer level model, a second data file specifying output of the second subsystem;

wherein the first data file and the second data file are specified in human-readable text.

16. The computer program product of claim 15, wherein the hardware implementation is a network-attached accelerator.

17. The computer program product of claim 16, wherein the hardware implementation is configured to perform blockchain transaction processing.

18. The computer program product of claim 15, wherein at least one of the first data file or the second data file specifies particular ports of the hardware implementation over which data specified by the first data file or the second data file is conveyed.

19. The computer program product of claim 15, wherein the program instructions are executable by the computer hardware to initiate operations including:

capturing output data generated by the reference software system;

comparing the second data file with the output data; and determining whether the hardware implementation behaves as designed based on the comparing.

20. The computer program product of claim 15, wherein at least one of the first data file or the second data file is encoded to specify data at a selected layer of an Open Systems Interconnect (OSI) model.

* * * * *